United States Patent [19]

Shelswell et al.

[11] Patent Number: 5,610,908
[45] Date of Patent: Mar. 11, 1997

[54] DIGITAL SIGNAL TRANSMISSION SYSTEM USING FREQUENCY DIVISION MULTIPLEX

[75] Inventors: Peter Shelswell, Horley; Mark Charles D. Maddocks, Redhill, both of United Kingdom

[73] Assignee: British Broadcasting Corporation, London, United Kingdom

[21] Appl. No.: 392,875

[22] PCT Filed: Sep. 6, 1993

[86] PCT No.: PCT/GB93/01884

§ 371 Date: Jul. 28, 1995

§ 102(e) Date: Jul. 28, 1995

[87] PCT Pub. No.: WO94/06231

PCT Pub. Date: Mar. 17, 1994

[30] Foreign Application Priority Data

Sep. 7, 1992 [GB] United Kingdom .................. 9218874

[51] Int. Cl.$^6$ ........................................................ H04L 5/06
[52] U.S. Cl. ........................ 370/210; 370/478; 370/484
[58] Field of Search ................................ 370/23, 21, 19, 370/70, 50, 20; 375/260, 261, 268

[56] References Cited

U.S. PATENT DOCUMENTS 4,495,620  1/1985  Steele et al. ............................. 370/118
4,881,241  11/1989  Pommier et al. ........................ 375/38

FOREIGN PATENT DOCUMENTS 0441730  8/1991  European Pat. Off. .
0499560  8/1992  European Pat. Off. .
0553841  8/1993  European Pat. Off. .
WO86/07223  12/1986  WIPO .

OTHER PUBLICATIONS

E. Feig et al. "Digital Implementation of Frequency Division Multiplexing on Peak–Limited Channels", *IEEE, International Conference on Acoustics, Speech, and Signal Processing ICASSP*, 1989, vol. 2, pp. 1364–1367.

B.T. Tan et al. "Crest Factor Minimisation in FDM PSK Systems", *Electronics Letters*, vol. 26, No. 13, 1990, pp. 859–861.

D.G.W. Ingram et al. "Application of Transform Techniques to Digital Line Codes and Data Transmission", *Electronics Letters*, vol. 18, No. 22, 1982, pp. 949–950.

L. Cimini, Jr. "Analysis and Simulation of a Digital Mobile Channel Using Orthogonal Frequency Division Multiplexing", *IEEE, Transactions on Communications*, vol. COM–33, No. 7, 1985, pp. 665–675.

D. Pommier et al. "New Prospects for High–Quality Digital Sound Broadcasting to Mobile, Portable and Fixed Radio Receivers", *IBC 88, IEE Conference Publication*, No. 293, pp. 349–353.

(List continued on next page.)

*Primary Examiner*—Douglas W. Olms
*Assistant Examiner*—Matthew C. Phillips
*Attorney, Agent, or Firm*—Milton Oliver

[57] ABSTRACT

A frequency-division multiplexer for carrying an OFDM signal on a large number of closely-spaced carriers receives the digital data at an input (12), applies coding such as convolutional coding (14), time interleaves (16) the signals, and assembles them frame-by-frame in a matrix (18). The data are converted to parallel form by a shift register (18), frequency interleaved (24), differentially encoded (26), and quadrature-phase-modulated (28) on several hundred or more closely-spaced carriers. A first inverse Fast Fourier Transform (FFT) circuit (30) transforms this information from the frequency domain into the time domain. Instead of being transmitted directly, the resultant signals are then amplitude-limited (42) and applied to an FFT (44) to reconvert them into the frequency domain. The phases of the wanted signals are then re-set, and the amplitudes of the signals near the edges of the band are reduced, in correction circuits (46). The resultant signals are applied to a second inverse FFT (48) for transmission. The output of the second inverse FFT contains smaller power peaks than the output of the first inverse FFT (30). The output is converted to serial form by a shift register (32), a guard interval is added (34), and the resultant converted (36) to analog form.

17 Claims, 9 Drawing Sheets

OTHER PUBLICATIONS

B. Le Floch et al. "Digital Sound Broadcasting to Mobile Receivers", *IEEE Transactions on Consumer Electronics*, vol 35, No. 3, Aug. 1989, pp. 493–503.

G. Plenge "DAB—A new sound broadcasting system Status of the development—Routes to its introduction", *EBU Review–Technical*, No. 246, Apr. 1991, pp. 87–112.

E.F. Casas et al. "OFDM for Data Communication Over Mobile Radio FM Channels—Part I: Analysis and Experimental Results", *IEEE Transactions on Communications*, vol. 39, No. 5, May 1991, pp. 783–793.

Digital Audio Broadcasting, "Strategies for the introduction of DAB worldwide Experimental evidence and recent system developments. Concepts for DAB into the 21st century", *Proceedings, First International Symposium on Digital Audio Broadcasting,* Jun. 1992, pp. 5–17 by D. Pommier, p. 75 by G. Plenge, pp. 83 and 96 by G. Stoll and pp. 99–109 by B. Fluch.

"Advanced digital techniques for UHF satellite broadcasting. Collected papers on concepts for sound broadcasting into the 21st century". European Broadcasting Union. *EBU Technical Center of the occasion of demonstrations of experimental UHF satellite sound broadcasting equipment during the ITU WARC–ORB (2) Conference, Geneva, Sep. 1988,* pp. 1–99.

DIGITAL SIGNAL TRANSMISSION SYSTEM USING FREQUENCY DIVISION MULTIPLEX

BACKGROUND OF THE INVENTION

This invention relates to a method and apparatus for transmitting digital data by a frequency division multiplex using a large number of closely-spaced carriers.

Orthogonal frequency division multiplex (OFDM) signals have been proposed for various applications, of which the first was digital audio broadcasting (DAB), also known as digital sound broadcasting (DSB); see Leonard J. Cimini, Jr., "Analysis and Simulation of a Digital Mobile Channel Using Orthogonal Frequency Division Multiplexing", IEEE Transactions on Communications, Vol. COM-33, No. 7, July 1985, pages 665 to 675. An OFDM signal consists of a large number of carriers, closely-spaced in frequency, and each modulated with data. Typically there will be several hundred or even more carriers.

The proposed DAB system involves:
(a) a Fast Fourier Transform (FFT) for both modulation and demodulation processes, to overcome frequency selectivity, using many simultaneous narrowband carriers,
(b) interleaving both in frequency and in time, to realize the large coding gain in all fixed and mobile receiving conditions, and
(c) coding, comprising for example convolutional coding in conjunction with a Viterbi maximum-likelihood decoding algorithm to provide a large coding gain, and possibly an outer block code concatenated with the convolution inner code.

Such a signal maybe termed a Coded Orthogonal Frequency Division Multiplex (COFDM).

For further background information concerning the COFDM proposal, reference may for example be made to:
(i) Pommier and Ratliff, "New Prospects for High Quality Digital Sound Broadcasting to Mobile Portable and Fixed Radio Receivers", TBC 88, IEE Conference Publication No. 293, pages 349 to 353.
(ii) Le Floch, et al., "Digital Sound Broadcasting to Mobile Receivers", IEEE Transactions on Consumer Electronics, Vol. 35, No. 3, August 1989, pages 493 to 503, which includes a block diagram of a proposed receiver.
(iii) Plenge, "DAB- A New Sound Broadcasting System. . . ", EBU Review—Technical, No. 246, April 1991, pages 87 to 112, which outlines the construction of both transmitter and receiver.
(iv) Casas, et al., "OFDM for Data Communications Over Mobile Radio FM Channels—Part I . . . " IEEE Transactions on Communications, Vol. 39, No. 5, May 1991, pages 783 to 793.
(v) Various papers presented at the First International Symposium on Digital Audio Broadcasting, Montreux 8–9 June 1992; eg. Le Floch, "Channel Coding and Modulation for DAB", Proceedings pages 99–109
(vi) U.S. Pat. No. 4,881,241.
(vii) European Patent Application EP-A-0 441 730.

In the proposed DAB system using COFDM, quadrature phase shift keying (QPSK) modulation, also termed 4-PSK modulation, is used to modulate the carriers prior to transformation by a fast Fourier transform circuit. In principle higher order PSK modulation systems could be used.

In an OFDM signal relatively high voltage peaks can occur for short periods of time when the various carriers are in phase. The ratio between the possible peak power and the mean power increases as the number of carriers increases. A problem then occurs when the signal is transmitted through a practical device (such as an amplifier), as the device must have a linear transfer characteristic with a large amount of "headroom" to prevent non-linear effects from occurring. In a transmitter network the amount of headroom required may significantly affect the cost of the transmitters. This headroom may be reduced if the instantaneous peak-to-mean power ratio of the signal can be reduced.

One method of reducing the peak-to-mean power ratio would be to use some of the data capacity of the system, so that the phase of a number of carriers can be chosen in each symbol to prevent large variations in the overall signal envelope from occurring. For DAB this is not possible because no spare data capacity exists for this purpose.

Another possibility would be to introduce a 45° phase shift on half the carriers; for example, on alternate carriers. This would ensure that the carriers could not all add up in phase at once. In practice, however, we have found that little improvement is obtained this way.

It might be thought that the desired reduction in peak power could be achieved simply by limiting the signal. However, this process introduces intermodulation products. In an OFDM system, the intermodulation products fall exactly on existing carriers, and so effectively change the amplitudes and phases of these carriers.

European Patent Application EP-A-0 499 560 (and corresponding Canadian Patent Application CA-A-2 059 455) describes a receiver designed for coherent demodulation of an OFDM signal. At the receiver the received OFDM signal in the time domain is transformed by an FFT into the frequency domain. The reference data is extracted, and from this the impulse response of the transmission channel is constructed by an inverse FFT. The various components of the resultant are then weighted to discard or reduce the effect of low level components, and the frequency response then estimated by a further FFT. This estimate of frequency response is then used to coherently demodulate the received data.

In U.S. Pat. No. 5,197,061 it has been proposed to apply two different levels of protection to different bits in a COFDM system, enabling a choice to be made as to which coding system is to be applied, thus optimizing the efficiency of the transmission.

It is well known, at a transmitter which encodes a signal, also to decode the encoded transmitted signal. This is an essential part of a delta modulation system which quantises an input and compares the quantised or encoded output with the next input to generate a differential signal for transmission. In United Kingdom Patent Specification GB-A-2 188 509 it is proposed to code a video signal in two different ways, and to decode both the resultants at the transmitter. Whichever coding system introduces least impairments is then employed for the actual transmission.

SUMMARY OF THE INVENTION

It is thus an object of the invention to provide a method and apparatus for reducing the peak amplitude or power of the components in a multiple-carrier frequency division multiplex signal such as a COFDM signal.

This invention provides a method and apparatus in which a large number of closely-spaced carriers are modulated by a phase shift keying modulation method with respective bits of the digital data to be transmitted. The resultant modulated signals are reversibly transformed, such as by an inverse Fourier transformation, from the frequency domain to the time domain.

In accordance with this invention, the transformed signals are not then transmitted, but first are limited so as to limit their amplitude or power. A second transform transforms the thus-limited time domain signals into a large number of signals in the frequency domain. The phase and/or amplitude of some of the signals is then adjusted, and finally the signals are again transformed from the frequency domain to the time domain to provide signals for transmission.

As example of the invention is described in more detail below with reference to the drawings. This example is concerned with the transmission of DAB signals by the COFDM method, and reduces the peak-to-mean power ratio of the signal by adjusting the carriers.

As DAB uses quadrature phase shift keying (QPSK) modulation in which the information is carried in the phase of the carriers, the amplitudes of each carrier can be allowed to change, symbol by symbol, to reduce the size of the peaks in the envelope of the overall signal.

By performing a Fast-Fourier Transform (FFT) to obtain the frequency-domain representation of the signal, firstly the out-of-band intermodulation products introduced by the limiting can be eliminated by setting the amplitude of the out-of-band carriers to zero, and then re-transforming with another inverse FFT to obtain the new time-representation of the signal. Secondly, the phase errors which result from simply limiting the signal can be eliminated by resetting the phases of the carriers to the correct values during the FFT and inverse FFT process. These two resetting methods can be used independently but are preferably used together.

In some cases, the presence of carriers at frequencies close to the main signal can be allowed and their presence used to reduce the peak voltages in the signal.

The method in fact makes use of the redundancy in the OFDM system which lies in the amplitudes of the carriers used in the PSK modulation. These amplitudes are assumed to be unity within the band zero out-of-band, but in accordance with this invention are allowed to vary in such a way as to reduce the peak transmission power. The amplitude of each carrier thus changes slightly in each symbol.

Amplitude redundancy is used in a non-changing way, as is proposed in International Patent Application Publication No. WO93/09616 published 13 May 1993, to carry additional data such as transmitter identification information. The present invention can be used in conjunction with that proposal.

The present method can be implemented by introducing one or more additional FFT and inverse FFT operations in the OFDM coder. Before the time-to-frequency conversion, the signal is limited, and before each frequency-to-time conversion, the out-of-band components are filtered and/or the carrier phases reset. In practice the OFDM coder may actually work by generating I and Q channels independently. If the system is applied to each FFT independently, then crosstalk may be introduced between the I and Q channels, and the phases of the signals are disturbed again. This effect is assumed to be insignificant in practice and is ignored in the following description.

BRIEF DESCRIPTION OF THE DRAWINGS

The invention will now be described in more detail, by way of example, with reference to the drawings, in which.

THE COFDM SYSTEM

A description will first be given of a COFDM system as it may be applied to the broadcasting of sound or television signals.

Figure 1:
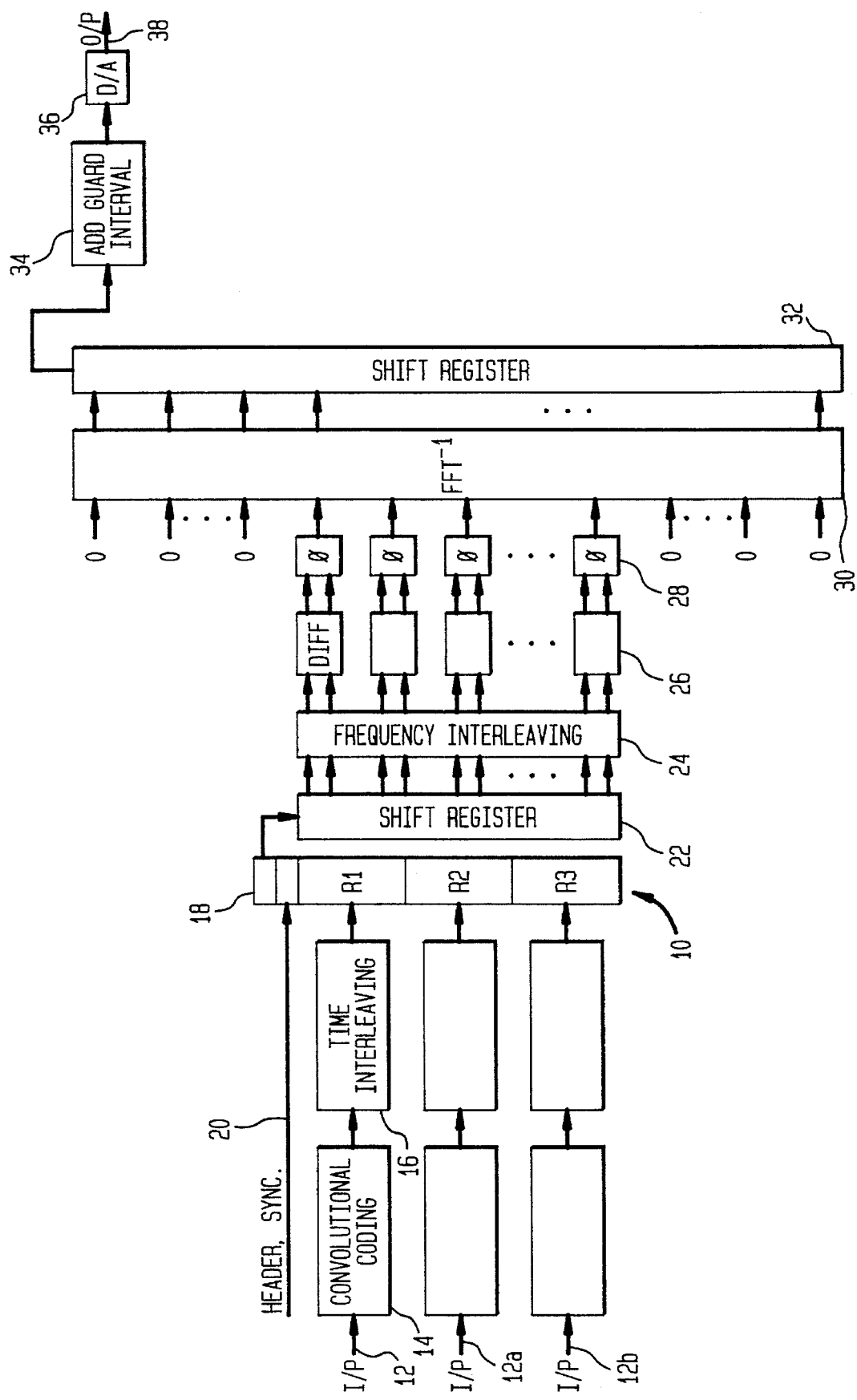
FIG. 1 is a block diagram of a COFDM transmitter as hitherto proposed.

FIG. 1 shows a COFDM coder 10 having inputs 12, 12a, 12b for receiving, in this example, three digital audio signals for transmission. The signal applied to input 12 is passed through a convolutional coder 14 and thence to a time interleaving circuit 16, and the signals at inputs 12a and 12b are similarly treated in corresponding circuits. The outputs of the time interleaving circuits are then assembled in a matrix 18. The matrix 18 also receives header and/or synchronising information from an input 20.

Figure 2:
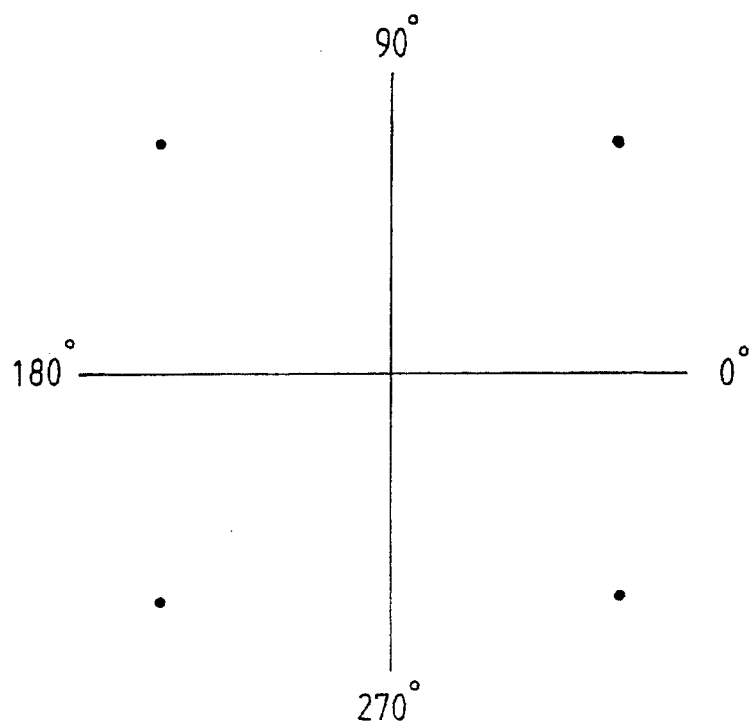
FIG. 2 shows the phases of a QPSK signal.

When the matrix 18 contains a complete frame of data, it is then extracted serially and turned into parallel format, illustratively by means of a shift register 22. The output of the matrix 18 is clocked in from one end of the shift register, and when the shift register is full the outputs from its individual stages are applied to a frequency interleaving circuit 24. From the frequency interleaving circuit 24 the signals are applied to differential coding circuits 26 which apply known differential coding techniques. The outputs of the differential coding circuits 26 are applied to a series of quadrature phase shift keying (QPSK) modulators 28. In this example QPSK is used which gives rise to four possible phase positions, as shown in FIG. 2, and thus two bits can be transmitted by each modulator 28. Thus the bits from the shift register 22 and in the frequency interleaving circuit 24 are paired, as shown.

The number of bits required to fill the shift register may in one example be defined as 3072 bits, and this number of bits is termed a 'symbol'. Thus there are 1536 circuits 28 which modulate the 3072 bits onto 1536 closely spaced carriers. These carriers are then applied to a fast Fourier transform (FFT) circuit 30. The FFT circuit 30 has 2048 inputs and 2048 outputs. The phase modulator circuits 28 are thus connected to the middle 1536 inputs, and the first 256 inputs and the last 256 inputs receive zero value inputs. This ensures that the top end of the baseband spectrum does not interfere with the bottom end of the first harmonic, introduced by the transform process.

The FFT circuit 30 is, strictly speaking, an inverse FFT circuit and is designated $FFT^{-1}$, and transforms the inputs which represent 1536 carriers at closely spaced frequencies into an output in the time domain. This output is reconverted back from parallel into serial form, illustratively by a shift register 32.

As will be appreciated the FFT circuit 30 operates symbol-by-symbol. The time between the start of operation for one symbol and the next is the symbol period $T_S$. The symbol period $T_S$ and the carrier frequencies at which the modulators 28 operate are related, in that the closely-spaced carrier frequencies are spaced by a multiple of $1/T_S$. This gives the multiplex the property of orthogonality.

Figure 3:
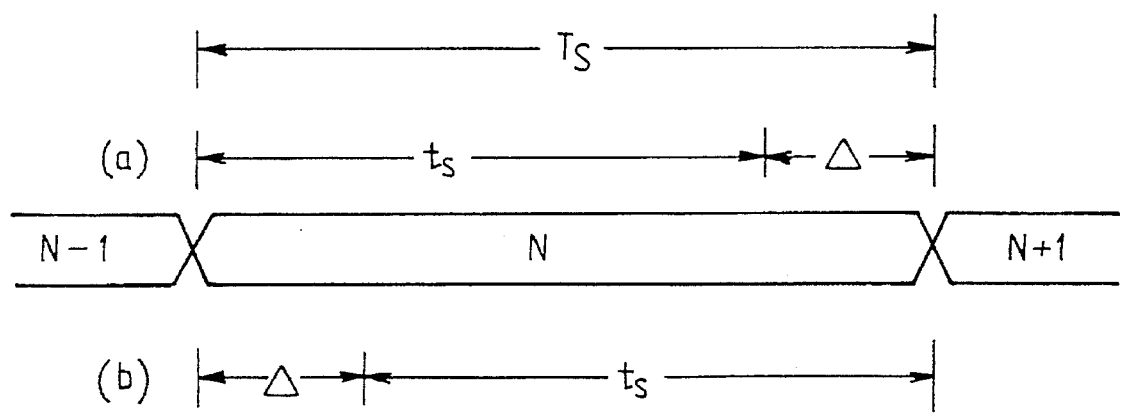
FIG. 3 illustrates the transmitted signal in three successive symbol periods.

The output of the shift register 32 is then applied to a circuit 34 which adds a guard interval to each symbol as received from the shift register. This is illustrated in FIG. 3, which shows three successive symbol periods $T_S$ for symbols N-1, N and N-1. The circuit 34 operates so that there is effectively a guard band between successive symbols. This is in fact achieved as shown at (a) in FIG. 3. The data is compressed so as to be transmitted in a portion $t_S$ of the total symbol period $T_S$, and the remaining portion indicated by the Greek letter delta ($\Delta$) is filled by repeating the first part of the data in the active symbol period $t_S$. This means that any time duration equal to $t_S$ within the overall symbol period $T_S$ will contain all the data bits. Finally the output of the guard interval circuit 34 is applied to a digital-to-analogue converter 36 and then to an output 38 for transmission over a broadcast transmission link.

Because of the property of the Fourier transform, the data can be processed at the receiver so long as all the data in the active signal period $t_S$ is received, regardless of exactly where the period $t_S$ falls in the overall symbol period $T_S$.

Furthermore, because of the property of the Fourier transform, a receiver can still decode the data if the signal shown in FIG. 3 has added to it another version of the same signal, delayed by an arbitrary amount, so long as that delay is less than the duration delta, namely the length of the guard interval. The decoding will be correct provided that the receiver does not mix the data relating to two successive symbols. To this end, the receiver is arranged to select the last portion of length $t_S$ in each symbol period $T_S$, as shown at (b) in FIG. 3. Signals delayed up to an amount equal to delta will correctly combine with the main signal without affecting the demultiplexed output at the receiver.

These properties of the system enable it to cope, without degradation, with multipath propagation provided that the maximum delay between the main signal and the echoes does not exceed delta.

If the guard interval is sufficiently long, the system can furthermore cope with the simultaneous reception of signals from two different transmitters, at different distances from the receiver, which are transmitting the same programe on the same frequency. This then enables the construction of the so-called Single Frequency Network (SFN). The system can also be shown to have a substantial degree of resistance to Doppler effects, such as occur in mobile receivers, see the references quoted in the introduction above.

The results described are achieved by the discrete Fourier transform as follows. At the input to the FFT circuit 30 the different data bits making up the symbol are carried (actually in pairs) on different carriers, which maintain their values for a symbol period. The data is thus represented in the frequency domain. The effect of the Fourier transform is to construct the equivalent waveform in the time domain. The Fourier transform furthermore permits easy implementation of time and frequency interleaving to distribute the data over the channel in such a way that when combined with the error protection provided by the coding scheme errors can be corrected to a substantial degree. This means that the signal has acquired a substantial degree of immunity to frequency selective fading.

Figure 4:
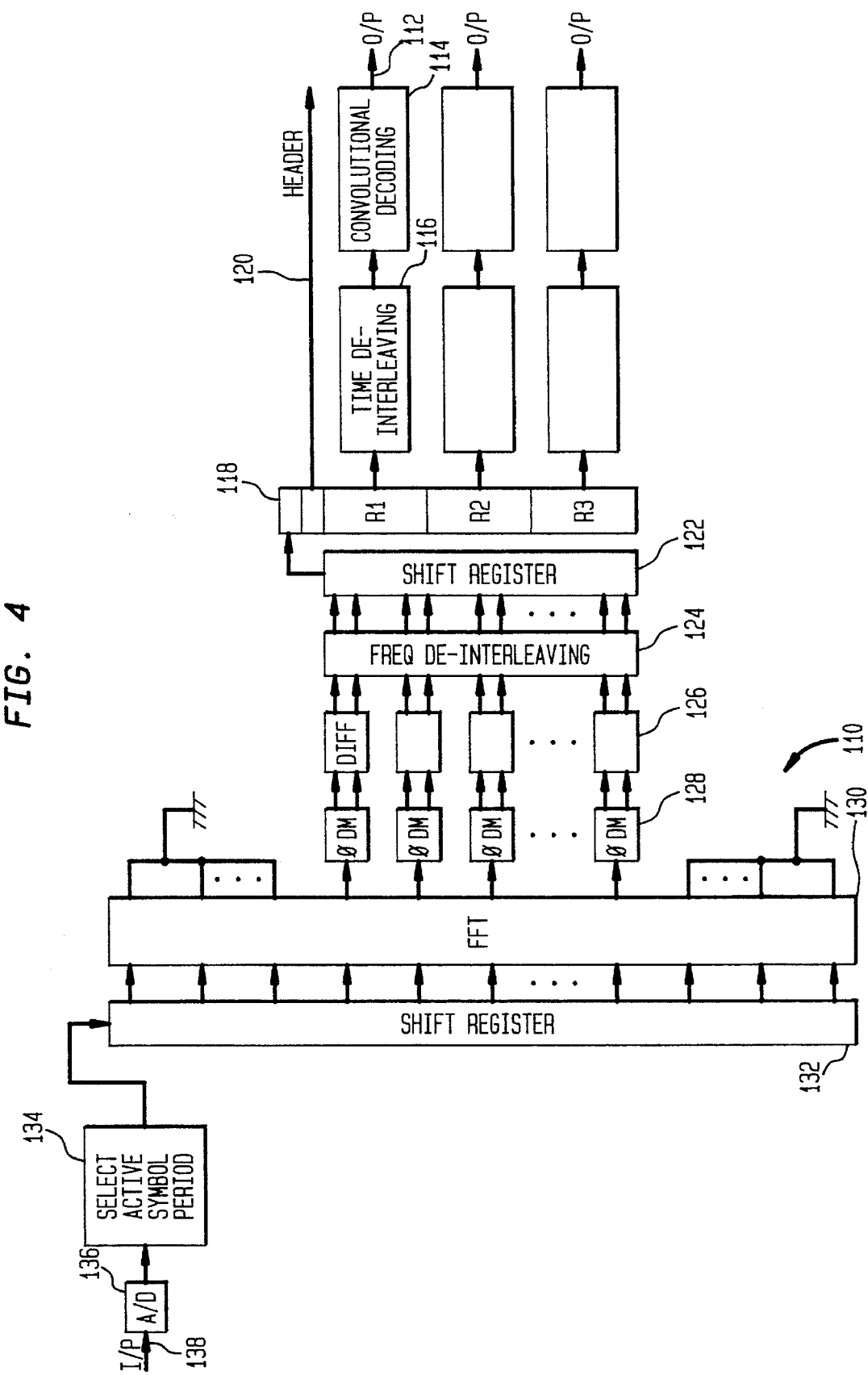
FIG. 4 is a block diagram of a COFDM receiver for use with the transmitter of FIG. 1.

A corresponding receiver 110 is shown in FIG. 4. This is shown conceptually as a mirror image of the transmitter illustrated in FIG. 1, and corresponding elements have reference numerals differing by 100. In a practical receiver, since only one programme will normally be received, it will be possible to time de-interleave the programmes first and select for processing only the programme desired at that time. This reduces the processing load.

Referring to FIG. 4, the transmitted signal is received at an input 138 and is applied to an analogue-to-digital converter 136. The active symbol period $t_S$ is then selected by circuit 134 in the manner described above with reference to FIG. 3, namely the last $t_S$ of the overall symbol period $T_S$ is taken. The signal is then applied to a shift register 132 which converts it to parallel format for application to the FFT circuit 130, which transforms the signal from the time domain back into the frequency domain on a symbol-by-symbol basis. The signals which were at the inputs to FFT 30 in the transmitter are now re-created.

The frequency domain outputs of FFT circuit 130 are phase demodulated by demodulators 128. It will be appreciated that only the middle 1536 of the 2048 outputs need to be demodulated. The demodulated signals are differentially decoded by circuits 126, and frequency de-interleaved at 124. A shift register 122 reconverts the signals to serial form, and the data is then re-formatted in a matrix 118, from which the constituent data streams can be read out. Each audio signal is time de-interleaved in a circuit 116 and convolutionally decoded in a decoder 114 for application to an output 112.

As shown three audio signals are combined for transmission but it will be appreciated that this number is only by way of illustration, and the precise form or content of the data stream to be transmitted may vary.

As noted above, this description has ignored the possibility that the I and Q components of the signal may be processed separately as this is not material to the present invention. Briefly, however, in the transmitter of FIG. 1, the inverse FFT circuit 30 would be replaced by two similar circuits operating in parallel, as will the FFT circuit 130 in the receiver of FIG. 4.

The Preferred Embodiment

Figure 5:
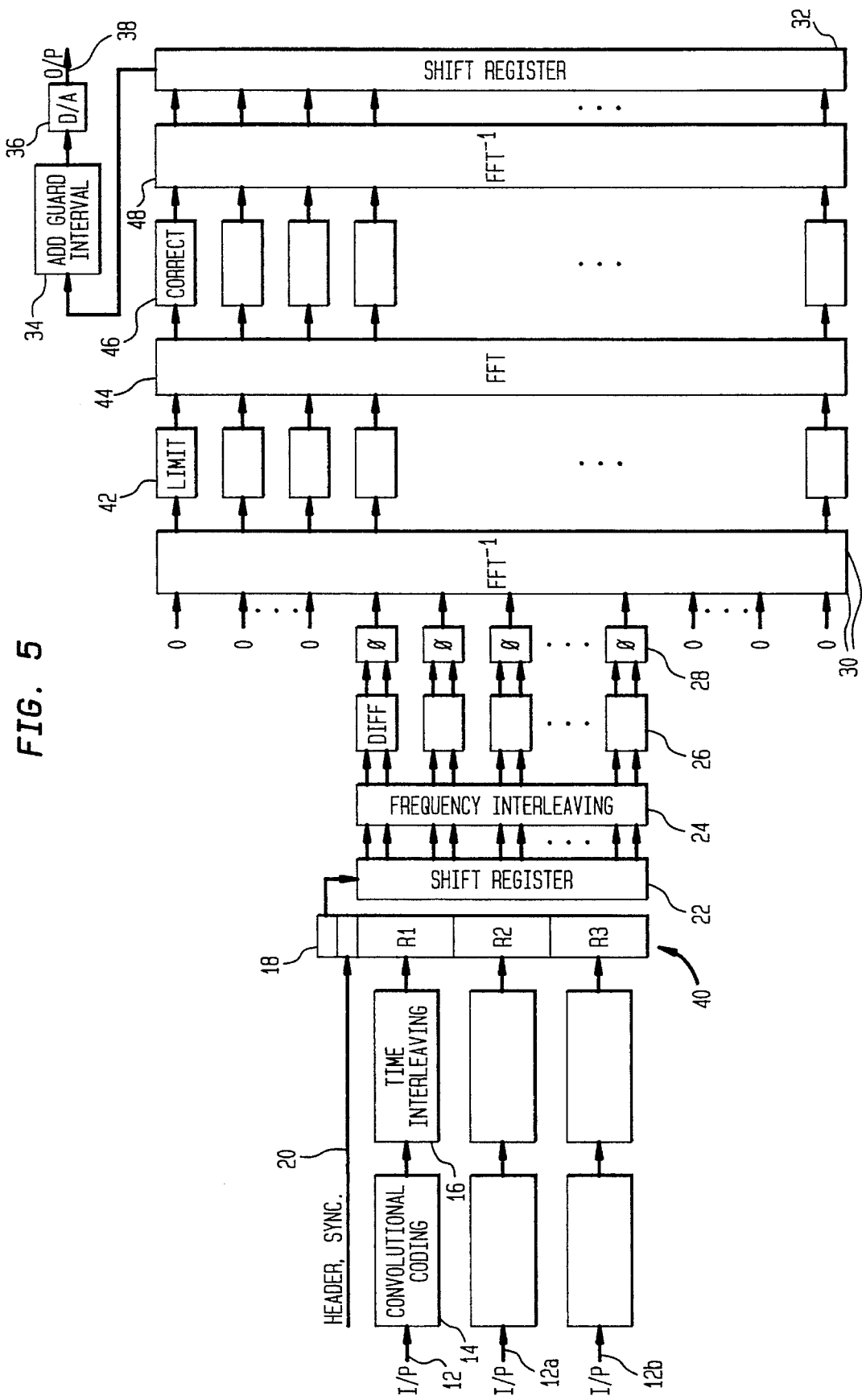
FIG. 5 is a block diagram of a COFDM transmitter embodying the present invention.

A COFDM transmitter 40 embodying the invention is shown in block diagram in FIG. 5. Much of this is identical to FIG. 1 and carries the same reference numerals, and will not be described again.

Instead of the output of the inverse FFT circuit 30 being connected directly to the shift register 32, a substantial amount of additional circuitry is included at this point.

The outputs of the FFT circuit 30 are applied to limiters 42 which provide a simple amplitude limiting function, though a more complex limiting function could be contemplated. The thus-limited signals are then applied to a (forward) FFT circuit 44 which reverses the operation of the inverse FFT circuit 30 and converts the signals back to the frequency domain. The FFT circuit 44 is like the FFT circuit 130 in the receiver. Were the limiters 42 not present, the outputs of FFT 44 would in theory be identical to the inputs of FFT 30. Because of the limiters 42 they are not identical, and various changes will have been introduced. Selected ones of these changes are then removed or reduced by appropriate adjustment achieved in individual correction circuits 46. The adjusted signals are then re-transformed by a second inverse FFT circuit 48, and it is the output of this circuit which is applied to shift register 32 for transmission.

In the event that the I and Q signals are transmitted separately, then the circuitry from the phase modulators 28 to the shift register 32 will be duplicated with the two signals processed in parallel.

The same receiver as in FIG. 4 is used without modification with the transmitter of FIG. 5.

The operation of the circuit of FIG. 5 will now be described with reference to the remaining figures.

Figure 6:
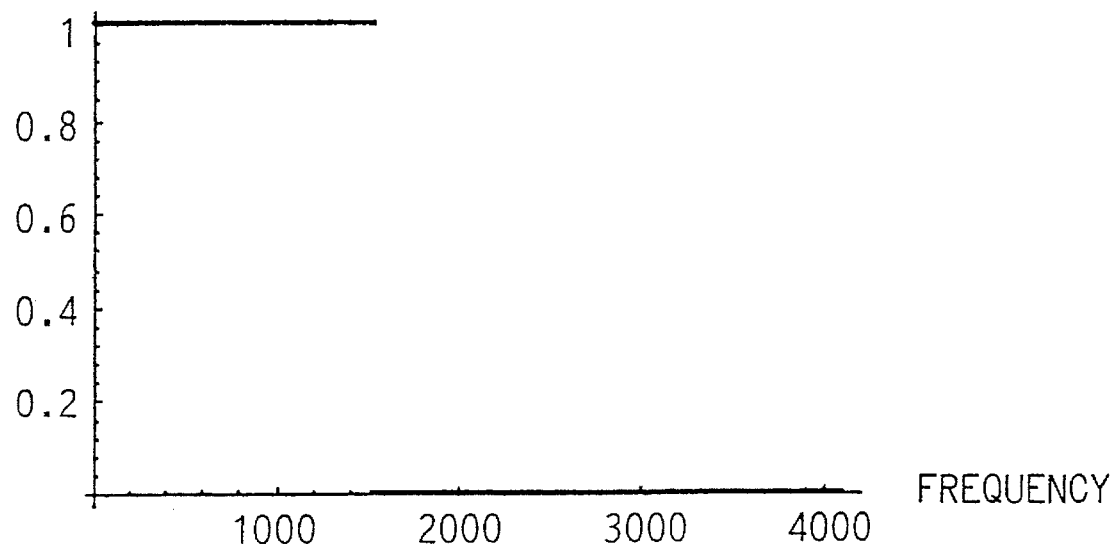
FIG. 6 shows in the frequency domain the spectrum of a COFDM signal with 1536 equal-amplitude carriers prior to Fourier transformation.
Figure 7:
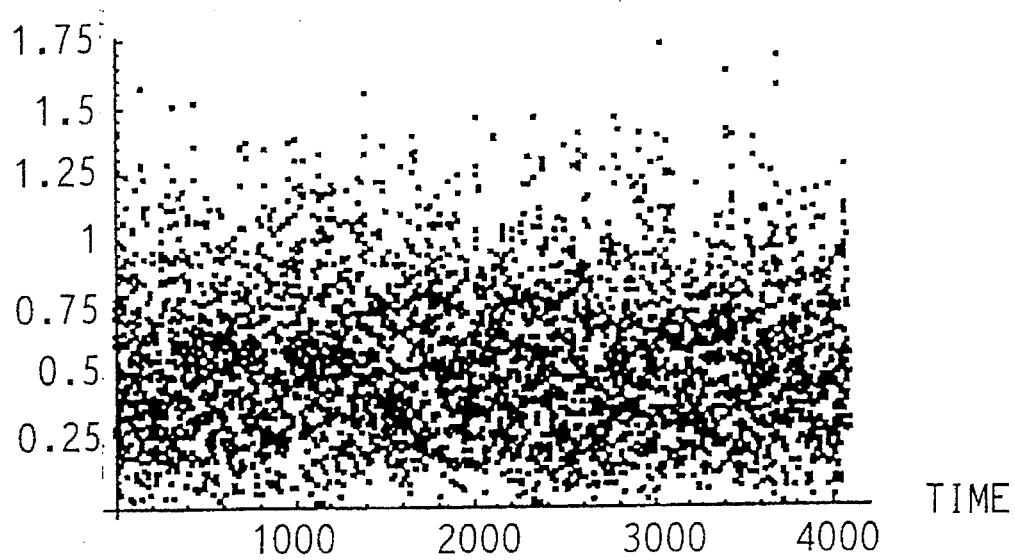
FIG. 7 shows the time-domain representation of the signal after Fourier transformation.

FIG. 6 represents, in the frequency domain, the set of 1536 carriers. The carriers are all of equal amplitude, and thus between the origin and carrier 1536 there is unity amplitude, and outside this region there is zero amplitude. After transformation by the FFT 30 into the time domain, the amplitudes are as shown in FIG. 7. In the example illustrated, this gives rise to amplitude peaks of about 1.75 on the arbitrary scale used.

Figure 8:
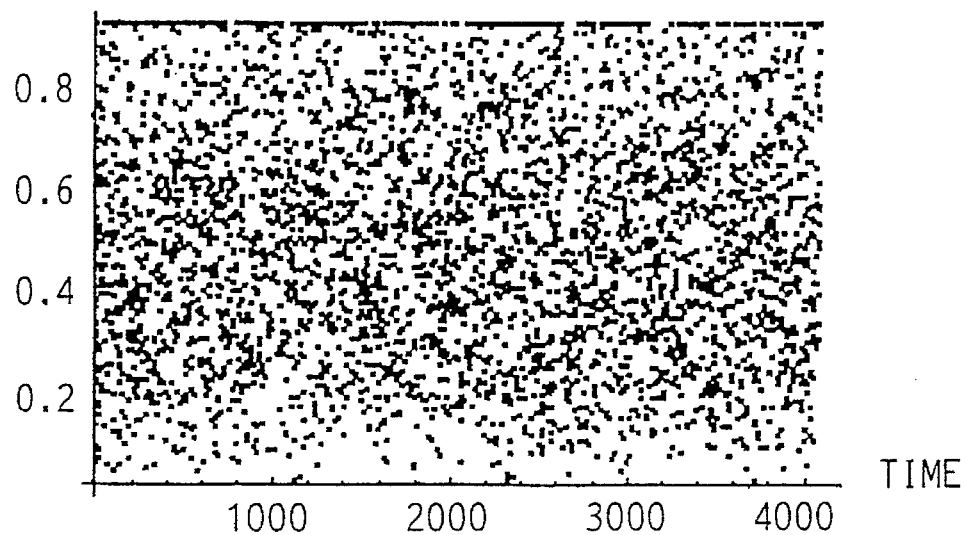
FIG. 8 shows the time-domain representation of the signal after subsequent amplitude limiting.

This signal is clipped at unity in the circuits 42 to produce the time domain representation as shown in FIG. 8, in which all values above 1.0 have now been reduced to 1.0, and all values below 1.0 are unchanged.

Figure 9:
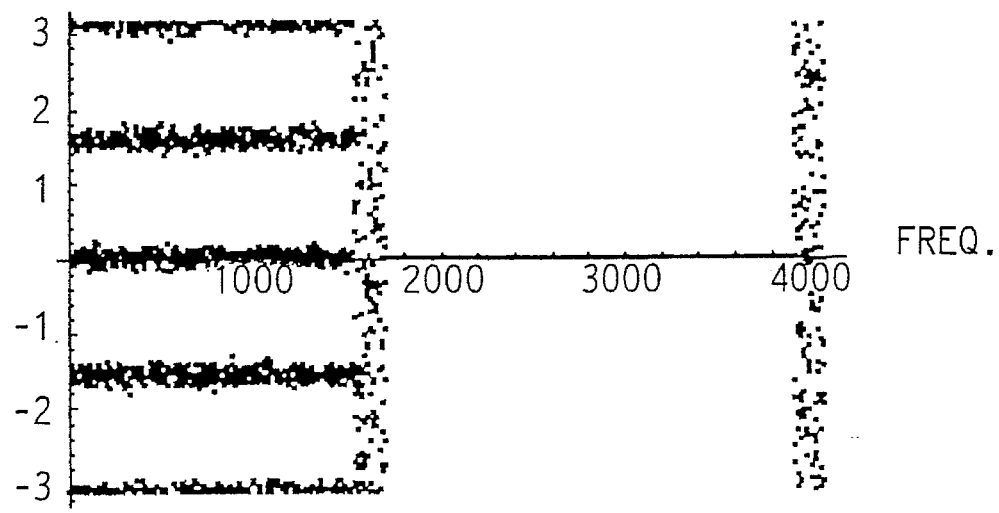
FIG. 9 shows the phase states of the processed signal in which phase errors are allowed on the active carriers.
Figure 10:
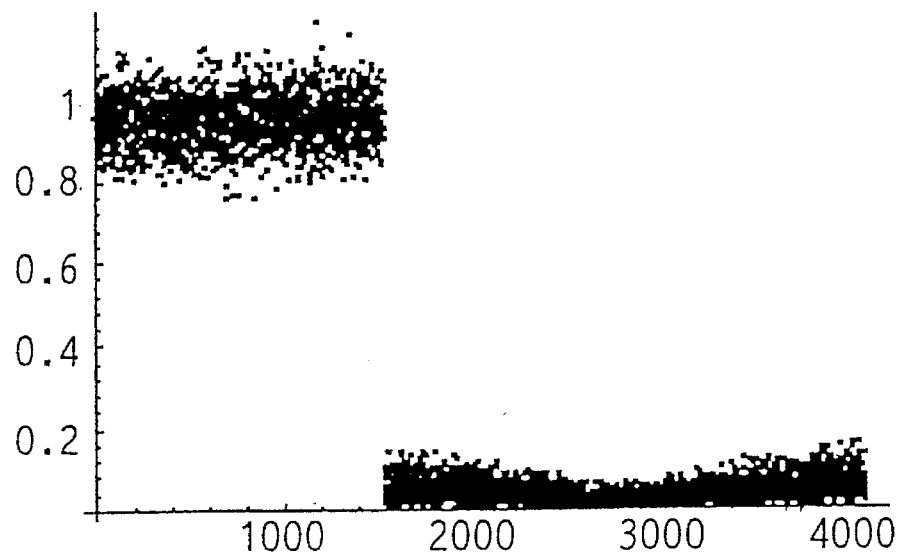
FIG. 10 shows the spectrum of the signal after limiting.

When these signals are converted back into the frequency domain, the results shown in FIGS. 9 and 10 are obtained. FIG. 9 shows the phases of the carriers. There are four phases, represented on an arbitrary scale respectively at 0, $+\pi/2$, $-\pi/2$ and $\pm\pi$ on the Y-axis in the figure. The values $+\pi$ and $-\pi$ correspond to the coincident $+180°$ and $-180°$ phase positions. Because of the spectrum folding or aliasing effect, the values shown below 4096 are conceptually the same as those just below zero on the X-axis, and thus the right-hand part of the figure can conveniently be considered as wrapped around to the left hand edge; the plot is substantially symmetrical about carrier 768. As is seen in FIG. 9, the phase values are not now precise but are spread around the nominal values. The harder the signals are limited, the greater is the spread.

FIG. 10 shows that the amplitudes have now also varied. Over the in-band region of carriers up to 1536 this variation is desired. It is the use of this variation that gives the redundancy the system requires in order to allow it to reduce the peak-to-mean power ratio, as indicated above. However there are now substantial out-of-band amplitude components above carrier 1536 up to carrier 4096. These out-of-band intermodulation products are in general undesirable as they will cause interference with adjacent signals.

Figure 11:
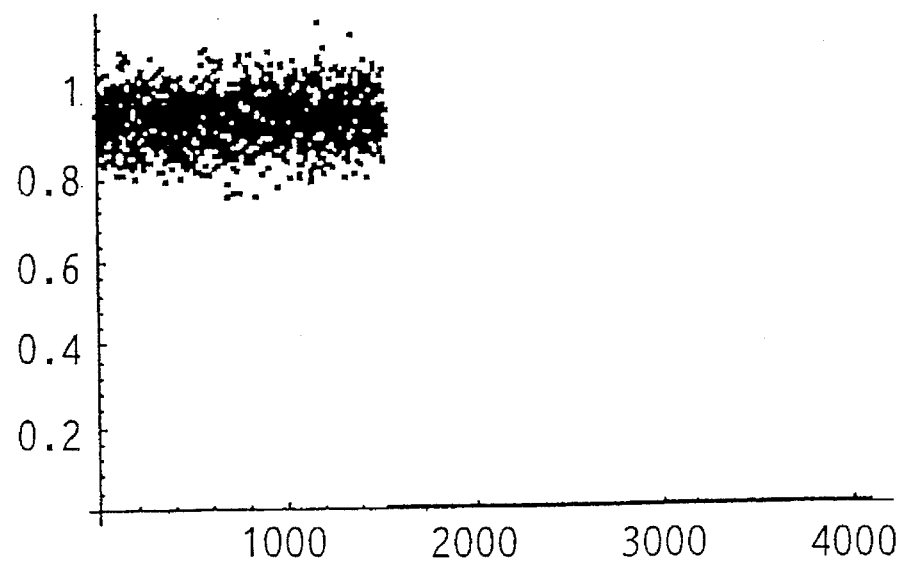
FIG. 11 shows the spectrum of the signal after filtering and with the phases of the active carriers reset.

(i) The correction circuits thus perform two operation the in-band phase values, which have become less precise as shown in FIG. 9, are reset to their accurate values, over carriers 1 to 1536; and (ii) the signal is filtered to remove the out-of-band carriers. The filtered signal is shown in FIG. 11. In particular, the carriers corresponding to the zero inputs in FFT 30 are again reset to zero.

In principle, the two correction operations are independent and either one can be used independently of the other. This is illustrated in the numerical example below.

Figure 12:
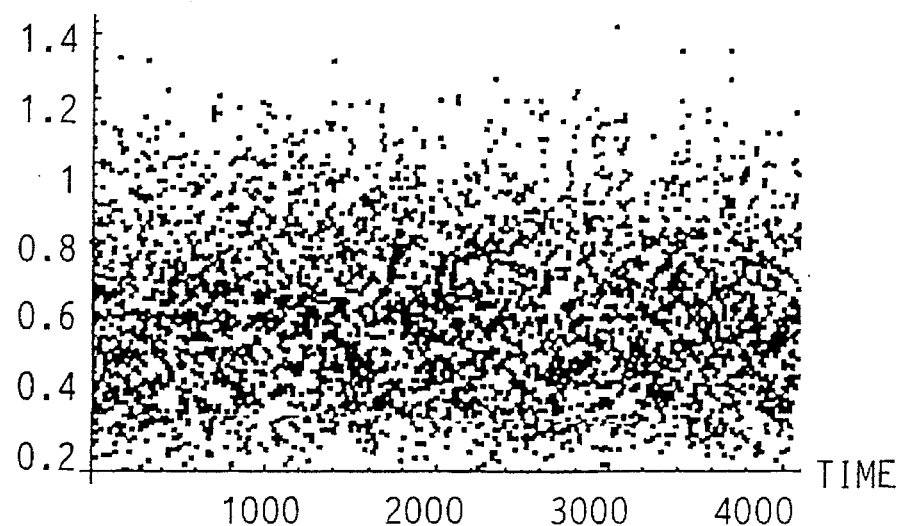
FIG. 12 is a time-domain representation of the signal after limiting and filtering.

Assuming both corrections to be applied, when the thus-adjusted signal is re-transformed in the inverse FFT 48, the time domain representation of the resultant signal is as in FIG. 12. The peak-to-mean ratio has again increased and the peak values are now at about 1.4. However, there is still a substantial improvement over the peak-to-mean ratio represented by FIG. 7.

As described above, it has been assumed that all the out-of-band components, as shown in FIG. 10, are removed, to produce the spectrum of FIG. 11. It may be preferable, however, to allow some of the out-of-band components which are near the in-band components to remain, and to apply a more gentle filtering function which increasingly reduces the out-of-band components as they get further away from the in-band components.

Figure 13:
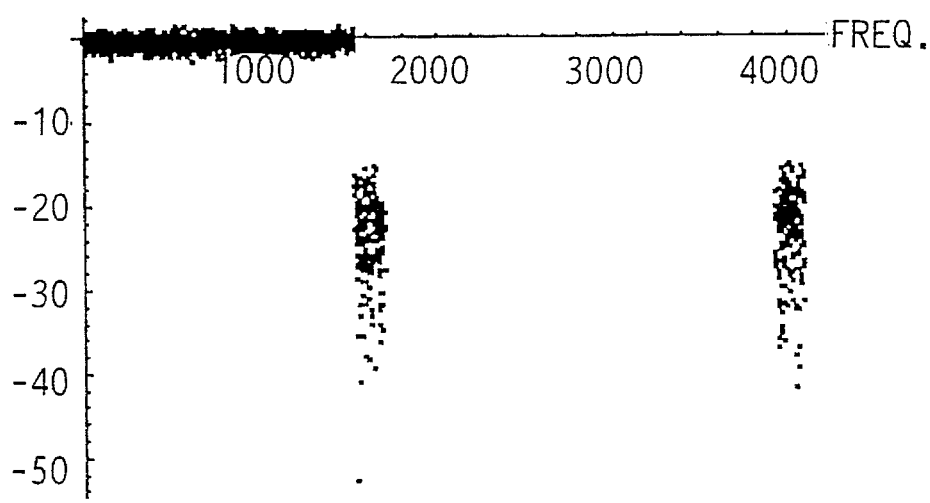
FIG. 13 shows the final spectrum of the signal.
Figure 14:
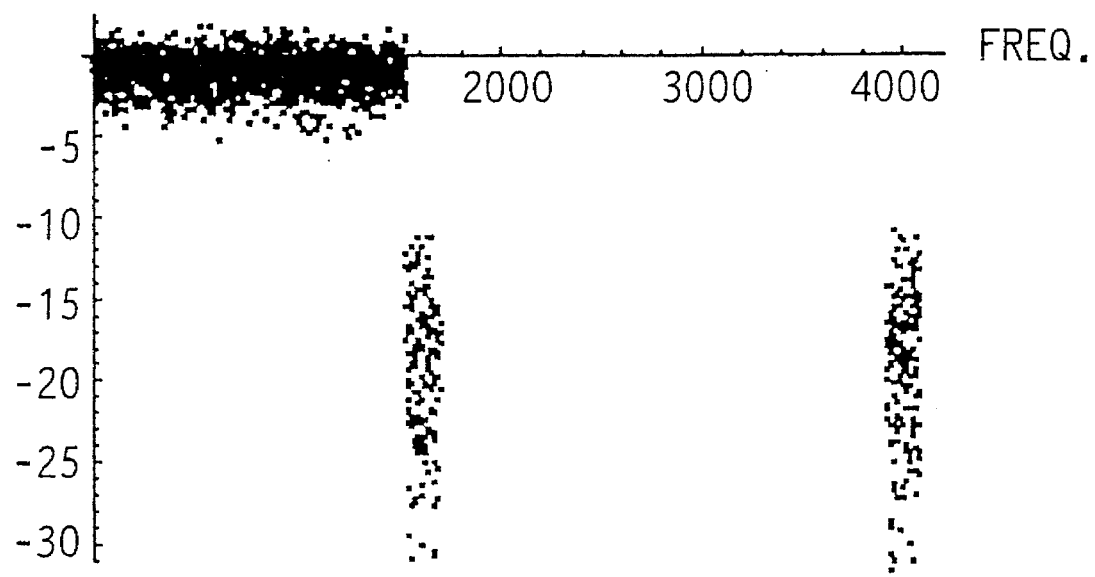
FIG. 14 shows the final spectrum of the signal after three iterations.

It will be appreciated that the operation described may be applied more than once in a repeating or iterative manner. That is, the components 42 to 48 may be repeated such that the output of inverse FFT 48 is applied to a second set of limiters like limiters 42. In principle, the more the number of iterations the better will be the result. FIG. 14 is a diagram similar to FIG. 13 of the signal after three iterations.

Various modifications may be made to the system described. In particular, while the various elements of FIG. 5 have been described and illustrated separately, it may be, as is common with complex signal processing, that their functions can be concatenated. More specifically the system could in principle be implemented in whole or in part on a general purpose computer, in which case FIG. 5 may be regarded as being in the nature of a flow chart rather than a hardware block diagram.

The current proposals are that the transform to be used is the Fourier transform, and it is unlikely in practice to be any other form of transform. Conceivably, however, other transforms or encoding functions which have the required properties, such as of reversibility and preserving orthogonality, could be employed.

While described in the context of a phase-shift keying modulation system, it is possible that the invention may be more generally applicable to other modulation systems. First of all, the method can be generalised to any modulation system which carries the information in the phases of the signal. For more complete generality, if a modulation system is used in which the information is carried in the amplitude of the individual carriers, then the individual phases could be adjusted to reduce the peaks in the overall signal.

The invention is of particular utility with and has been described in the context of the transmission of audio or video signals, but is not limited thereto and can be used more generally for data transmission. In this respect the terms +"transmission" and "transmitter" are not limited to broadcast transmission but are intended to cover signal sourcing of any type, including point-to-point transmission and also recording for example.

Numerical Example

A computer simulation has been used to explore the properties of the preferred system described. In this simulation its peak-to-mean ratio of twenty random signals was calculated, and the mean value was found to be 9.38 dB±0.14 dB for the 90% confidence interval. This value is the peak-to-peak power (rather than amplitude) ratio, where the peak power has a probability of occurring of $2\times10^{-4}$. A signal with a peak-to-mean power ratio of 9.32 dB, being close to the average, was then taken for investigation.

The signal was when processed in a variety of ways for six different clipping levels, and the results are set out in the Table appended to this description. All the values in the table are in decibels (dB). In the table, the five columns represent the following:

A—shows six limiting points for which values were obtained, ie the maximum peak-to-mean ratio allowed by the limiters 42 of FIG. 5.

B—gives the peak-to-mean ratio values of the output of the transmitter 40 of FIG. 5, where the correction circuit resets the phases of the 1536 active carriers, but in which the filtering strips off all the out-of-band carriers and there is no guard band between adjacent DAB block allocations.

C—gives the peak-to-mean power ratios if the phases are not reset an the out-of-band carriers are all filtered out.

D—gives the peak-to-mean power ratios if the phases are reset and some out-of-band carriers are retained at a low level in a portion of the spectrum 170 kHz wide on either side of the main signal, thus effectively making use of the guard band between DAB allocations.

E—gives the peak-to-mean power ratios if the phases are not reset, but some out-of-band carriers are allowed as in D.

The effect of not resetting the phases of the active carriers is identical to allowing the intermodulation products to remain in the signal. In practice, the main effect is a loss of noise margin.

The results shown in the Table indicate that there is a significant benefit in allowing low level out-of-band intermodulation products to be retained. Also, for large amounts of limitation, there is around a 2 dB benefit in allowing phase errors to remain on the wanted or active carriers. However, this will lead to some signal degradation.

For 3 dB limitation, the result in column D was recalculated for a system in which there were two or more iterations of the method. A second identical iteration reduced the peak-to-mean power ratio from 6.7 dB to 5.3 dB, and a third iteration reduced it further to 4.5 dB. As noted above, the spectrum after the first and third iterations is shown in FIG. 13 and FIG. 14 respectively. There figures indicate the amount of adjustment in the amplitudes of the signal that the been required.

In any event it is seen that, by appropriate choice, of the parameters, the peak-to-mean power ratio can be reduced to around or below 6 dB by applying the methods described. An amplifier operating with this amount of headroom should not generate a significant amount of out-of-band components which would otherwise cause interference to adjacent DAB blocks. The amplitude of each carrier changes slightly with each symbol in such a way that the overall peaks are effectively reduced.

TABLE

| A | B | C | D | E |
|---|---|---|---|---|
| 6.0 | 8.5 | 7.7 | 8.2 | 7.3 |
| 5.0 | 8.2 | 7.0 | 7.8 | 6.5 |
| 4.0 | 7.8 | 6.2 | 7.3 | 5.6 |
| 3.0 | 7.4 | 5.4 | 6.7 | 4.7 |
| 2.0 | 6.9 | 4.6 | 6.1 | 4.0 |
| 1.0 | 6.2 | 3.8 | 5.4 | 3.4 |

We claim:

1. A method of transmitting a digital data stream on a many-carrier frequency-division-multiplex signal, comprising the steps of:

modulating a plurality of carriers with respective bits of the digital data by a modulation method which carries the information in the phase or amplitude of the individual carriers to provide a plurality of first modulated signals;

reversibly transforming the first modulated signals from the frequency domain to the time domain to provide first time domain signals;

limiting the first time domain signal to limit their amplitude or power to provide limited time domain signals;

inversely transforming the limited time domain signals into a plurality of second modulated signals in the frequency domain;

adjusting the phase and/or amplitude of some of the second modulating signals to provide a plurality of adjusted signals; and transforming the adjusted signals from the frequency domain to the time domain to provide second time domain signals for transmission.

2. A many-carrier frequency-division-multiplex transmitter, comprising:

input means for receiving a digital data stream for transmission;

means coupled to the input means for modulating a plurality of carriers with respective bits of the digital data by a modulation method which carries the information in the phase or amplitude of the individual carriers to provide a plurality of first modulated signals;

first transform means coupled to the modulating means for reversibly transforming the first modulated signals from the frequency domains to the time domain to provide first time domain signals;

means coupled to the first transform means for limiting the first time domain signals to limit their amplitude or power to provide limited time domain signals;

second transforms means coupled to the limiting means for inversely transforming the limit time domain signals into a plurality of second modulated signals in the frequency domain;

means coupled to the second transform means for adjusting the phase and/or amplitude of some of the second modulated signals to provide a plurality of adjusted signals; and third transform means coupled to the adjusting means for transforming the adjusting signals from the frequency domain to the time domain to provide second time domain signals for transmission.

3. A transmitter according to claim 2, in which the adjusting means resets the phases of at least some of the second modulated signals.

4. A transmitter according to claim 2, in which the adjusting means filters out some of the second modulated signals.

5. A transmitter according to claim 2, in which there are more first time domain signals than there are first modulated signals, and the adjusting means reduces the amplitude of some of the second modulated signals which do not correspond to first modulated signals.

6. A transmitter according to claim 2, in which the modulating means, first transform means, limiting means, second transform means, adjusting means, and third transform means, operate on successive groups of data bits.

7. A transmitter according to claim 6, in which the periodicity of the said successive groups, in $T_S$, and the spacing of the carriers is $1/T_S$ or a multiple thereof.

8. A transmitter according to claim 2, in which the modulating means is a quadrature phase shift keying or 4-PSK modulator.

9. A transmitter according to claim 2, in which the second transform means transforms with a Fourier transform, and the first and third transform means transform with an inverse Fourier transform.

10. A transmitter according to claim 2, in which the limiting means, second transform means, adjusting means, and third transform means are repeated one or more than to provide an iterative operation.

11. A transmitter according to claim 2, in which the modulation means modulates in accordance with a phase shift keying modulation method.

12. A method of transmitting a digital data stream on a many-carrier frequency-division-multiplex signal, comprising the steps of:

- modulating a plurality of carriers with respective bits of the digital data to provide a plurality of modulated signals;
- reversibly encoding the modulated signals by an encoding function to provide encoded signals;
- subjecting the encoded signals to a predetermined function to provide modified encoded signals;
- decoding the modified encoded signals to provide decoded signals;
- adjusting at least some of the decoded signals to conform more closely with the modulated signals and provide adjusted signals; and
- recording the adjusted signals by the said encoding function to provide encoded output signals for transmission.

13. Apparatus for transmitting a digital data stream on a many-carrier frequency-division-multiplex signal, comprising:

- input means for receiving a digital data stream for transmission;
- means coupled to the input means for modulating a plurality of carriers with respective bits of the digital data to provide a plurality of modulated signals;
- encoding means coupled to the modulating means for reversibly encoding the modulated signals by an encoding function to provide encoded signals;
- means coupled to the encoding means for subjecting the encoded signals to a predetermined function to provide modified encoded signals;
- decoding means coupled to the function subjecting means for decoding the modified encoded signals to provide decoded signals;
- means coupled to the decoding means for adjusting at least some of the decoded signals to conform more closely with the modulated signals and provide adjusted signals; and
- recoding means coupled to the adjusting means for recoding the adjusted signals by the said encoding function to provide encoded output signals for transmission.

14. Apparatus according to claim 13, in which the means for subjecting the encoded signals to a predetermined function comprises means for limiting the encoded signals.

15. Apparatus according to claim 13, in which the decoding means comprises transform means for transforming the modified encoded signals from the time domain into a large number of decoded signals in the frequency domain.

16. Apparatus according to claim 13, in which the means for adjusting at least some of the decoded signals comprises means for adjusting the phase and/or amplitude of some of the decoded signals.

17. Apparatus according to claim 13, in which the recording means comprises means for transforming the adjusted signals from the frequency domain to the time domain.

* * * * *